Patented Mar. 6, 1923.

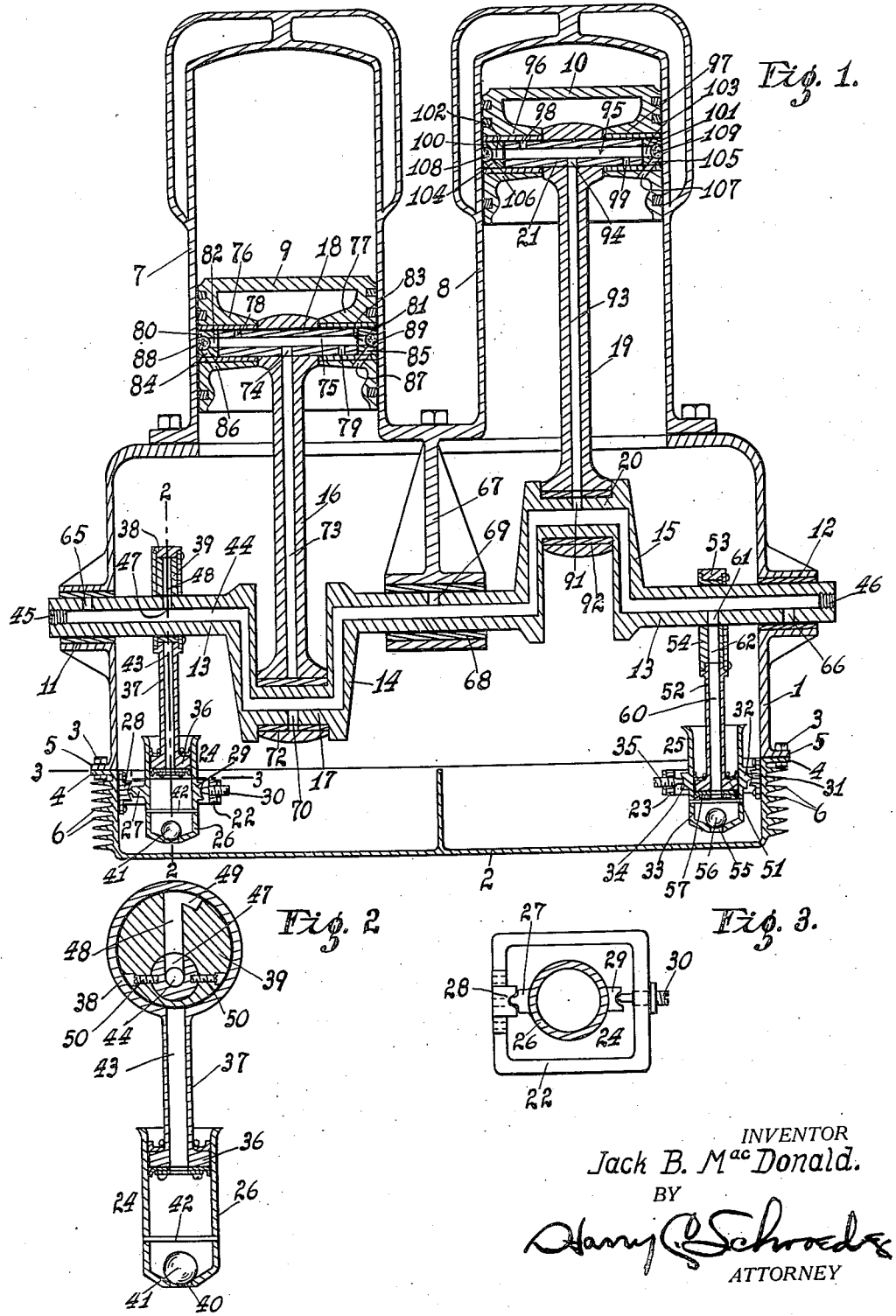

1,447,313

UNITED STATES PATENT OFFICE.

JACK B. MacDONALD, OF OAKLAND, CALIFORNIA.

OILING SYSTEM.

Application filed January 20, 1921. Serial No. 438,624.

*To all whom it may concern:*

Be it known that I, JACK B. MACDONALD, a citizen of the United States, residing at Oakland, in the county of Alameda and State of California, have invented certain new and useful Improvements in Oiling Systems, of which the following is a specification.

My invention is an improved pressure oiling system for gas engines which is positive and efficient in operation.

Referring to the annexed drawing in which my invention is illustrated and which forms a part of this specification:

Figure 1 is a vertical section of a gas engine embodying my invention.

Figure 2 is a sectional view taken on line 2—2 of Figure 1.

Figure 3 is a sectional view taken on line 3—3 of Figure 1.

In the drawing, 1 indicates the crank case of the engine, to the bottom of which is bolted an oil sump 2 by means of bolts 3 which extend through flanges 4 and 5 on the sump and crank case respectively. The sump 2 has heat radiating flanges 6 extending from its side walls. Cylinders 7 and 8 are bolted to the top of the crank case 1 in which reciprocate pistons 9 and 10 respectively. In bearings 11 and 12 in the crank case are journaled a crank shaft 13 which includes two cranks 14 and 15. A pitman 16 is connected at one end to crank pin 17 of crank 14 and at its other end to piston connecting pin 18 of piston 9. A pitman 19 connects crank 15 and piston 10, said pitman being connected at one end to crank pin 20 and at its other end to piston connecting pin 21. Frames 22 and 23 are secured inside the sump 2 to the inside of the end walls of the sump for mounting oil pumps 24 and 25 respectively. The pump cylinder 26 of pump 24 has a point journal 27 which turns in a conical bearing 28 on the inside of the frame 22, and a conical bearing 29 opposite said point journal which is engaged by a screw point journal 30 which is screw seated in the frame 22 opposite bearing 28. The frame 23 has a conical bearing 31 on its inside in which turns a point journal 32 on the cylinder 33 of pump 25, and said cylinder has a conical bearing 34 opposite journal 32 in which engages a screw point journal 35 which is screw seated in the frame 23 opposite the frame bearing 31. In the cylinder 26 of pump 24 reciprocates a piston 36 to which is connected one end of a piston rod 37, the other end of said rod being connected to an eccentric strap 38 which encircles an eccentric 39 on the left end of the crank shaft 13. In the bottom of the pump cylinder 26 is a port 40 and a ball valve 41 controlling said port, a rod 42 extending across the cylinder above the valve to confine its movement. An oil conduit 43 extends through the piston 36, rod 37 and eccentric strap 38. An oil conduit 44 extends through the crank shaft 13 from end to end and is closed at its ends by screw plugs 45 and 46, screwing into the ends of the crank shaft. The crank shaft has a port 47 extending radially from the port 44 and communicating with a port 48 extending outwardly through the eccentric 39 on a diameter of the eccentric and a short distance circumferentially at the periphery of the eccentric as indicated at 49. The eccentric may be secured to the crank shaft by set screws 50. In the cylinder 33 of pump 25 reciprocates a piston 51 to which is connected one end of a piston rod 52, the other end of said rod being connected to an eccentric strap 53 which encircles an eccentric 54 secured on the right end of the crank shaft 13. In the bottom of pump cylinder 33 is a port 55 controlled by a ball valve 56, a rod 57 extending across said cylinder to confine the movement of said valve. An oil conduit 60 extends through the piston 51, rod 52 and eccentric strap 53. A port 61 extends radially from the crank shaft conduit 44 through the crank shaft and communicates with a conduit 62 extending through the eccentric 54 on a diameter thereof. The crank shaft 13 has two ports 65 and 66 which lead from conduit 44 into the bearings 11 and 12 respectively. From the base of the cylinders 7 and 8 between said cylinders depends a hanger 67 on which is a bearing 68 in which the crank shaft 13 is journaled between its cranks 14 and 15. The crank shaft has a port 69 leading from the conduit 44 into the bearing 68. The crank pin 17 is provided with two ports 70 and 71 leading radially out from the conduit 44, the port 70 leading into the pitman bearing 72 in which the pin 17 is journaled and the port 71 leading into a conduit 73 leading longitudinally through the pitman 16 to a port 74 in the piston connecting pin 18, which port communicates with a conduit 75 extending longitudinally through the pin 18. The pin 18 oscillates with the pitman 16 and is journaled in bearings 76 and 77 in the piston 7 and has two ports 78 and 79 leading from the conduit 75 into said bearing respectively to lubricate the bearing. Plugs 80 and 81 are placed in the outer ends of the bearings 76 and 77. Said plugs have ports 82 and 83 which respectively communicate with the ends of the pin conduit 75, and ports 84 and 85 leading from the outer ends of the plug ports 82 and 83 respectively through the under side of the plugs and communicating with ports 86 and 87 which extend through the lower side of the bearings 76 and 77 into the piston 9. Sponges 88 and 89 are placed in the outer end of the ports 82 and 84 and the outer end of the ports 83 and 85 respectively. The crank pin 20 has two ports 90 and 91 leading radially from the conduit 44, the port 90 communicating with the pitman bearing 92 in which the crank pin 20 is journaled and the port 91 communicating with a conduit 93 leading longitudinally through the pitman 19 to a port 94 in the pin 21 which port leads into a conduit 95 extending longitudinally through said pin. The pin 21 oscillates with the pitman 19 and is journaled in bearings 96 and 97 in the piston 10 and has ports 98 and 99 leading from the conduit 95 into said bearings respectively to lubricate the bearing. Plugs 100 and 101 are placed in the outer ends of the bearings 96 and 97. Said plugs have ports 102 and 103 which respectively communicate with the ends of the conduit 95, and ports 104 and 105 leading from the outer end of ports 102 and 103 through the lower side of the plugs and communicating with ports 106 and 107 respectively leading through the under side of the bearings 96 and 97 into the piston 10. Sponges 108 and 109 are placed in the outer ends of the plug ports 102 and 104 and the plug ports 103 and 105.

In operation the pumps 24 and 25 on their compression stroke force oil through conduits 43, 48 and conduits 60 and 62 into conduit 44. From conduit 44 the oil is forced through port 65 into bearing 11, through port 70 into bearing 72, through port 71, conduit 73, and port 74 into conduit 75, through said conduit and ports 78 and 79 into bearings 76 and 77 and through ports 82 and 83 from said conduit into sponges 88 and 89. From conduit 44 the oil is forced through port 90 into bearing 92, through port 91, conduit 93 and port 94 into conduit 95, and from conduit 95, through ports 98 and 99 into bearings 96 and 97 and through ports 102 and 103 into the sponges 108 and 109. From the conduit 44 oil is forced through ports 66 and 69 into bearings 12 and 68. Any surplus oil in the system is forced through sponges 88, 89, 108 and 109, ports 84 and 86, ports 85 and 87, ports 104 and 106 and ports 105 and 107 into the cylinders 7 and 8 and back into the sump 2.

Having described my invention, I claim:

1. In an oiling system for gas engines, the crank shaft being provided with an oil conduit extending from end to end and with ports leading outwardly from said conduit, certain of said ports leading into the crank shaft bearings, certain of said ports leading through the crank pins into the pitman bearings, the pitmen being provided with longitudinal conduits communicating with certain of said ports, the piston wrist connecting pins being provided with longitudinal conduits and with ports leading from said conduits to the pitman conduits, and ports leading into the wrist pin bearings to lubricate the bearings, means communicating with said wrist pin conduits for absorbing oil and for returning surplus oil to the crank case, and means for forcing oil through the system.

2. In an oiling system for gas engines, the crank shaft being provided with an oil conduit extending from end to end and with ports leading outwardly from said conduit, certain of said ports leading into the crank shaft bearings, certain of said ports leading through the crank pins into the pitman bearings, the pitmen being provided with longitudinal conduits communicating with certain of said ports, the piston wrist connecting pins being provided with longitudinal conduits and with ports leading from said conduits to the pitman conduits, and ports leading into the wrist pin bearings to lubricate the bearings, plugs in the end of the wrist pin bearings provided with ports leading from the ends of the wrist pin conduits, and with other ports leading from the outer ends of said first ports to ports leading through the wrist pin bearings into the crank case, sponges in the outer ends of the plug ports, and means for forcing oil through the system.

In testimony whereof I affix my signature.

JACK B. MacDONALD.